H. HARRIS.
Fans.
No. 155,189.
Patented Sept. 22, 1874.
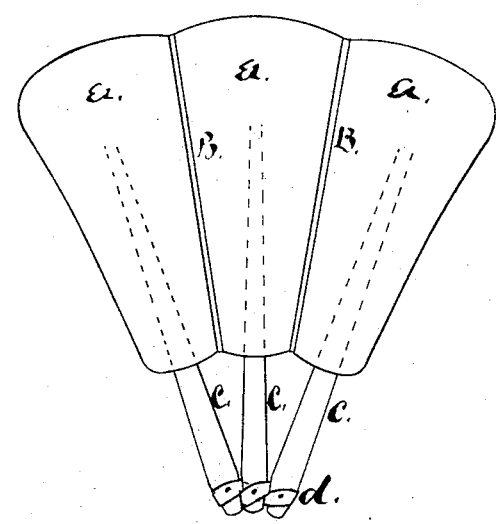
Witness
Fred: Hewitt
Robt G Hall
Inventor
Horace Harris

UNITED STATES PATENT OFFICE.

HORACE HARRIS, OF NEWARK, NEW JERSEY, ASSIGNOR TO EMILY BATTELSON, OF SAME PLACE.

IMPROVEMENT IN FANS.

Specification forming part of Letters Patent No. 155,189, dated September 22, 1874; application filed July 18, 1872.

*To all whom it may concern:*

Be it known that I, HORACE HARRIS, of Newark, in the county of Essex and State of New Jersey, have invented certain Improvements in Fans, of which the following is a specification:

My invention consists in the breadth of the separate leaves, and in the mode of arranging and folding the sticks.

The fan is made with two or more broad sections, A, jointed at B. These separate sections may be of one or two pieces or thicknesses of any suitable material. The sticks C are attached to the center of these sections and come together below, and when the fan is open lie side by side. These sticks are held in position by means of a piece of tape, d, or by other suitable fixture, passing over and between them in such a manner as to enable them to fold each upon the other when the fan is closed.

The broad leaves, while they are superior for "raising a breeze," are also valuable for printing or sketching on their plain surfaces, for the purposes of advertising, or for other matter to be published and kept in sight, or on which to make notes, as a brief for a public speaker; and the folding of the sticks upon each other allows of the turning over of the leaves, as of a book, from beginning to end.

I claim—

A fan having the sticks carrying the leaves connected by means of the fixture or attaching device D, constructed and arranged to operate substantially as described.

HORACE HARRIS.

Witnesses:
J. H. S. VAN KNESS,
BENJ. H. VAN NESS.